US 10,737,886 B2

(12) United States Patent
Grindel et al.

(10) Patent No.: US 10,737,886 B2
(45) Date of Patent: Aug. 11, 2020

(54) MATERIAL PROCESSING APPARATUS

(71) Applicant: Terex GB Limited, Dungannon, County Tyrone (GB)

(72) Inventors: Gerard Grindel, Omagh (GB); Richard Byrne, Dungannon (GB)

(*) Notice: Subject to any disclaimer, the term of this patent is extended or adjusted under 35 U.S.C. 154(b) by 0 days.

(21) Appl. No.: 16/443,947

(22) Filed: Jun. 18, 2019

(65) Prior Publication Data

US 2019/0389666 A1   Dec. 26, 2019

(30) Foreign Application Priority Data

Jun. 22, 2018 (GB) .................................. 1810328.3

(51) Int. Cl.
*B65G 41/00* (2006.01)

(52) U.S. Cl.
CPC ......... *B65G 41/008* (2013.01); *B65G 41/002* (2013.01)

(58) Field of Classification Search
CPC .... B65G 41/00; B65G 41/002; B65G 41/005; B65G 41/008; B62D 21/14; B60P 1/36; B60P 1/38
USPC ................................................. 198/302, 313
See application file for complete search history.

(56) References Cited

U.S. PATENT DOCUMENTS

| | | | |
|---|---|---|---|
| 4,135,614 A * | 1/1979 | Penterman | B65G 41/008 198/306 |
| 4,427,104 A * | 1/1984 | Reid, Jr. | B65G 41/002 198/306 |
| 4,860,878 A | 8/1989 | Mraz et al. | |
| 6,106,211 A * | 8/2000 | Westwood | B60P 1/56 222/160 |
| 6,386,352 B1 * | 5/2002 | Baker | B65G 41/005 198/300 |
| 10,011,443 B2 * | 7/2018 | McCloskey | B65G 41/008 |
| 2012/0048674 A1 | 3/2012 | Smith et al. | |
| 2018/0148280 A1 | 5/2018 | McCloskey et al. | |

FOREIGN PATENT DOCUMENTS

| | | |
|---|---|---|
| CN | 201567058 U | 9/2010 |
| CN | 106315114 A | 1/2017 |
| CN | 107902362 A | 4/2018 |
| EP | 0175422 A1 | 3/1986 |
| EP | 1364714 A1 | 11/2003 |
| EP | 2767340 A1 | 8/2014 |

(Continued)

OTHER PUBLICATIONS

Search Report dated Dec. 24, 2018, for United Kingdom application No. GB1810328.3.

(Continued)

*Primary Examiner* — Gene O Crawford
*Assistant Examiner* — Keith R Campbell
(74) *Attorney, Agent, or Firm* — Warner Norcross + Judd LLP

(57) ABSTRACT

A conveyor apparatus with a chassis having first and second chassis parts that pivot relative to one another to allow an intermediate section of the chassis to be raised or lowered. This allows the height of the conveyor apparatus to be reduced for transport. When the conveyor is out of its deployed state, the conveyor is foldable and movable with respect to the chassis in a longitudinal direction. This allows the length of the conveyor apparatus to be reduced for transport.

20 Claims, 13 Drawing Sheets

(56) References Cited

FOREIGN PATENT DOCUMENTS

| | | |
|---|---|---|
| FR | 3049277 A1 | 9/2017 |
| GB | 1219368 | 3/1968 |
| GB | 1219368 | 1/1971 |
| JP | 2005272037 A | 10/2005 |
| WO | 2013057300 A2 | 4/2013 |

OTHER PUBLICATIONS

European Search Report, dated Nov. 20, 2019, for EP patent application EP19181394, a foreign counterpart.

* cited by examiner

MATERIAL PROCESSING APPARATUS

FIELD OF THE INVENTION

This invention relates to material processing apparatus. The invention relates particularly to conveyors and especially, but not exclusively to radial conveyors.

BACKGROUND TO THE INVENTION

A radial conveyor is a type of material processing apparatus and comprises a conveyor mounted on a wheeled support structure, the wheels being configured to allow the conveyor to move in a radial, or arc-like, manner about a centre point. Like other material processing apparatus, it is common to transport radial conveyors in a container such as a shipping container. However, even though radial conveyors can usually reconfigured for stowage, they can still be too long and/or too high to fit into standard shipping containers and the like.

Another issue with radial conveyors is how to control its radial operating angle. A conventional approach is to place stops in the path of part of the machine and to halt radial movement of the conveyor when a stop is detected. However, if an operator forgets to place the stops, or places them in the wrong position, the conveyor will be incorrectly positioned.

It would be desirable therefore to provide an improved radial conveyor that mitigates the problems outlined above. It will be understood that aspects of the invention described herein may be used with other material processing apparatus.

SUMMARY OF THE INVENTION

A first aspect of the invention provides a chassis comprising a first chassis part coupled to a second chassis part by a coupling that allows relative pivoting movement between the first and second chassis parts to allow an intermediate section of the chassis to be raised or lowered.

A second aspect of the invention provides a conveyor apparatus comprising:
  a chassis having a longitudinal axis;
  a conveyor supported on the chassis, the conveyor being movable into and out of a deployed state,
  wherein, when said conveyor is out of said deployed state, said conveyor is movable with respect to said chassis in a longitudinal direction.

A third aspect of the invention provides a radial conveyor apparatus comprising a conveyor supported on a chassis, the chassis being pivotably coupled to a base by a pivot joint that allows pivoting movement of said chassis and said conveyor about a pivot axis that is perpendicular to a ground surface, wherein said pivot joint comprises an upper joint part coupled to said chassis, and a lower joint part coupled to said base, said upper and lower parts being coupled together by a spindle that defines said pivot axis and about which the upper joint part is rotatable with respect to the lower part, and wherein said pivot joint includes a rotation sensor for detecting an angular position of said upper joint part with respect to a reference position.

Preferably, said coupling includes a locking device that is operable between a locking mode in which it prevents said relative pivoting movement between the first and second chassis parts, and an unlocked mode in which it allows said relative pivoting movement.

Preferably, said coupling includes a first pivot axis running transversely of the chassis and being located between first and second ends of the chassis, said relative pivoting movement comprising movement about said pivot axis.

Preferably, said first and second chassis parts are pivotable between an operating state in which said intermediate section is relatively raised, and a lowered state in which said intermediate section is lowered with respect to said operating state.

Advantageously, in the locking mode, the locking device locks the chassis in the operating state, and in the unlocked mode, the locking device allows said the chassis parts to adopt the lowered state.

In typical embodiments, each chassis part comprises at least one wheel assembly, said intermediate section being located between said at least one wheel assembly of the first chassis part and said at lease one wheel assembly of the second chassis part. Said second chassis part typically has a wheel axis, and wherein said relative pivoting movement involves pivoting movement of said second chassis part about said wheel axis with respect to the first chassis part. Said second chassis part is preferably configured such that its centre of mass is located on the same side of its wheel axis as said intermediate section.

In preferred embodiments, said first chassis part includes a link structure that is pivotably coupled to the second chassis part for pivoting about said first pivot axis. Said link structure may be pivotably coupled to the first chassis part for pivoting about a second pivot axis that is longitudinally spaced apart and parallel with said first pivot axis. Preferably, said locking device is coupled between the link structure and the second chassis part and wherein, in the locking mode, the locking device rigidly fixes the link structure with respect to the second chassis part preventing pivoting of said link structure about the first pivot axis, and in the unlocked mode, the locking device permits pivoting of said link structure about the first pivot axis. Preferably, the link structure pivots downwardly as the chassis moves from the operating state to the lowered state, and pivots upwards as the chassis moves from the lowered state to the operating state.

In preferred embodiments, said locking device comprises at least one bolt with at least one corresponding nut, and wherein said at least one bolt disposed perpendicular to the longitudinal and transverse directions of the chassis, and wherein the position of said at least one nut on the respective bolt determines the amount of said relative pivoting movement. Said at least one bolt is preferably long enough to allow said at least one corresponding nut to be positioned on the respective bolt to allow the pivoting movement of the chassis between the operating and transport states.

In preferred embodiments, in said deployed state, said conveyor is pivotably coupled to said chassis, said apparatus further including an extendible conveyor support coupled between said conveyor and said chassis and operable to raise or lower a first end of said conveyor by pivoting said conveyor with respect to said chassis. Preferably, when said conveyor is out of said deployed state is disposed substantially parallel with said longitudinal axis. Typically, said pivotable coupling of said conveyor is provided by a pivotable support structure, typically located at a second end of said conveyor, and wherein, when said conveyor is out of said deployed state, said pivotable support structure is decoupled to allow movement of said conveyor with respect to said chassis in said longitudinal direction.

When said conveyor is out of said deployed state, it may be supported by at least one roller and/or at least one slide provided on said chassis for facilitating said movement of said conveyor with respect to said chassis in said longitudinal direction.

When said conveyor is not in said deployed state, said conveyor support may be retractable to move said conveyor with respect to said chassis in said longitudinal direction.

In preferred embodiments, when said conveyor is in said deployed state, an end of said conveyor support is pivotably coupled to said chassis, and when said conveyor is out of said deployed state, said end of said conveyor support is decoupled from said chassis to allow said conveyor support to move with said conveyor in said longitudinal direction. Preferably, at least one track is provided on said chassis, said end of said conveyor support being movable along said at least one track when said end of said conveyor support is decoupled from said chassis.

In preferred embodiments, said conveyor includes at least one extendible conveyor portion, said at least one extendible portion typically being telescopically extendible or foldable with respect to said conveyor, and wherein when said conveyor is out of said deployed state said at least one extendible conveyor portion is folded or otherwise retracted to shorten the length of said conveyor. Preferably, said at least one extendible conveyor portion comprises an extendible base conveyor portion located at a second end of said conveyor and substantially at a first end of said chassis, and wherein when said conveyor is out of said deployed state, said conveyor is movable with respect to said chassis in a longitudinal direction towards said first end of the chassis.

In preferred embodiments, the sensor is provided on either one of the upper joint part or the spindle. A sensor target is typically provided on the other of the upper joint part or the spindle, the sensor being directed at the target. The respective one of the target or the sensor may be provided on an end of the spindle that protrudes into the upper joint part, preferably on a top face of the spindle. The respective other of the sensor or the target may be provided on the upper joint part at a location facing, and preferably adjacent, the end of the spindle.

In preferred embodiments, said rotation sensor is a non-contact sensor. Preferably said rotation sensor is a magnetic sensor. Said target may comprise a magnet.

Said upper joint part may include part of a second pivot joint.

In preferred embodiments said rotation sensor is configured to generate an output signal indicative of the angular position of said upper joint part, said apparatus including, or being co-operable with, a controller configured to use said output signal to determine an angular position of said conveyor and said chassis.

Each aspect of the present invention may be used without either of the other aspects of the invention, or in combination with either one or both of the other aspects of the invention as would be apparent to a skilled person.

BRIEF DESCRIPTION OF THE DRAWINGS

Embodiments of the invention are now described by way of example and with reference to the accompanying drawings in which.

DETAILED DESCRIPTION OF THE DRAWINGS

Figure 1:
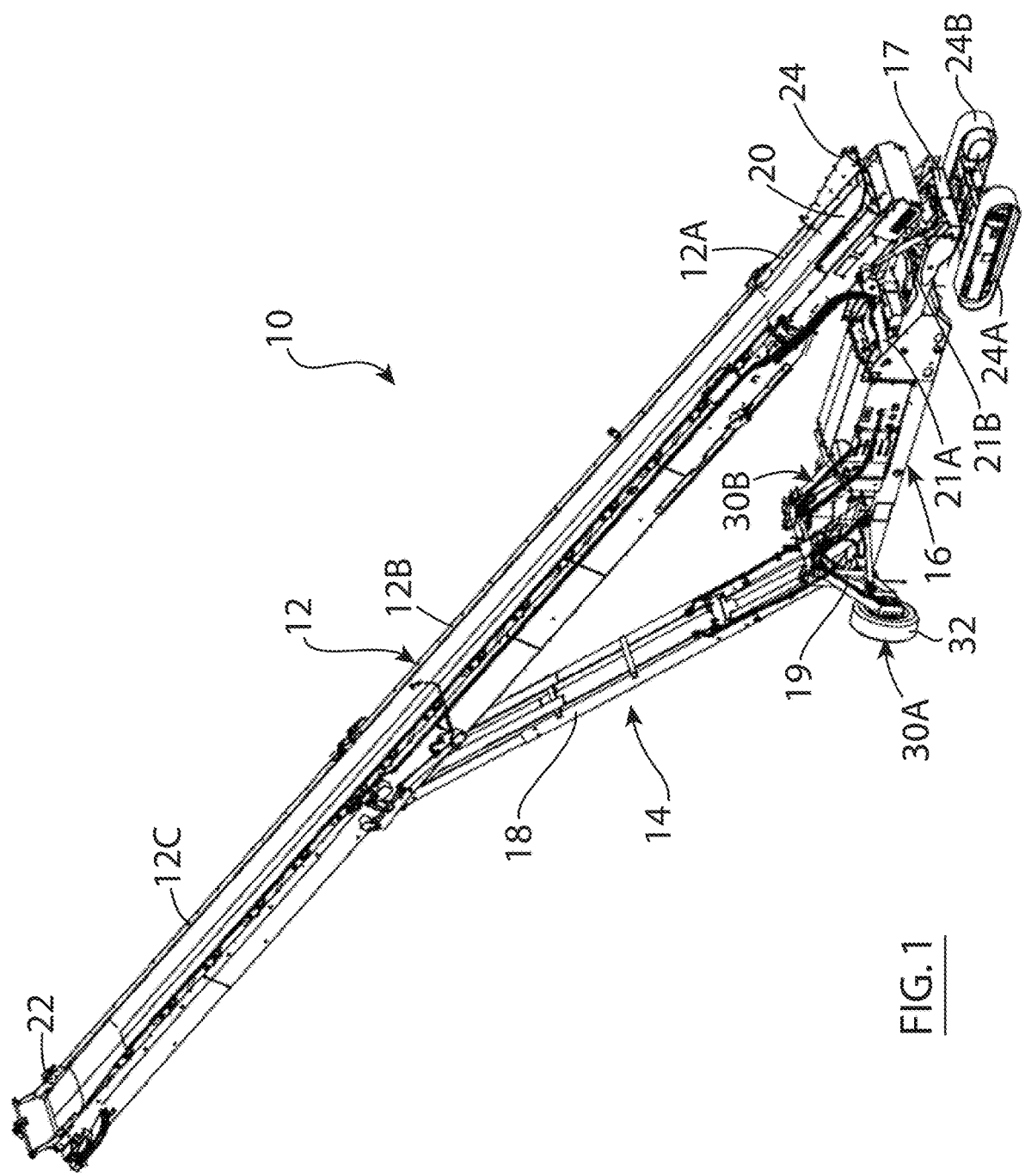
FIG. 1 is a perspective view of a radial conveyor apparatus in a deployed state.

It is noted that in the drawings features may be omitted for reasons of clarity or in order that other features are visible, as would be apparent to a skilled person.

Referring in particular to FIG. 1, there is shown a radial conveyor apparatus 10 embodying the invention. The conveyor apparatus 10 is of a general type commonly referred to as "radial conveyors". The conveyor apparatus 10 comprises a conveyor 12, which is optionally extendible, e.g. telescopically extendable and/or with folding parts. The conveyor 12 is supported by a wheeled support structure 14. In preferred embodiments, the support structure 14 comprises a chassis 16 and a conveyor support 18 extending between the chassis 16 and the conveyor 12 to support the conveyor 12 with respect to the chassis 16. The conveyor support 18 is preferably extendable in order to adjust the position of the conveyor 12 with respect to the chassis 16, in particular to raise or lower the height of the conveyor 12. In preferred embodiments, the conveyor support 18 comprises a telescopically extendible frame. The conveyor support 18 typically includes one or more powered actuators, e.g. hydraulic rams, for extending and retracting the support 18. For example, the conveyor support 18 may comprise three sections: a lower section releasably coupled to the chassis; a middle section, which conveniently carries actuator(s) e.g. hydraulic ram(s) for extension/retraction; and an upper section. Both the upper and lower sections may be telescopically extendible with respect to the middle section. In normal use of the apparatus 10, the upper section extends in and out with respect to the middle section to raise and lower the conveyor 12. To effect the transport state, the lower section may be unpinned to allow it to slide up into the middle section to shorten the overall length of the support 18.

The conveyor 12 has a feed end 20 and a discharge end 22. A hopper 24 may be provided at the feed end 20 for loading material (not shown) onto the conveyor 12. In use, the conveyor 12 receives material at the feed end 20 and conveys the material to the discharge end 22 to be discharged to a desired location, e.g. a stockpile or a material processing apparatus (not shown).

The feed end 20 of the conveyor 12 is pivotably coupled to the chassis 16 such that the discharge end 22 is raised or lowered as the conveyor 12 pivots with respect to the chassis 16. Typically, the conveyor 18 is pivotably coupled to the chassis 16 at a first (or rear) end 17 of the chassis 16. The coupling at the end 17 may be provided by a support structure 21, which may take any suitable form, for example comprising one or more pivotable link 21A and one or more extendable structure 21B (e.g. comprising one or more ram). The pitch of the conveyor 12 with respect to the chassis 16 is determined by the length of the conveyor support 18, which is preferably extendible/retractable to hold the conveyor 12 at any one of a plurality of different pitches thereby raising or lowering the height of the discharge end 22.

The conveyor support 18 has one end pivotably coupled to the chassis 16, the other end pivotably coupled to the conveyor 12 and is extendible in its end-to-end direction to allow the conveyor 12 to pivot with respect to the chassis 16. The conveyor support 18 may be lockable in any one of a plurality of states of relative extension/retraction in order to support the conveyor 12 at a desired pitch with respect to the chassis 16. In the illustrated embodiment the conveyor support 18 is coupled to the chassis 16 at a second (or front) end 19 of the chassis 16 opposite the end 17 at which the conveyor 18 is coupled to the chassis. Alternatively, the conveyor support 18 may be coupled to the chassis 16 at any other location spaced apart (along the longitudinal axis of the conveyor) from the location at which the conveyor 18 is coupled to the chassis 16. In the illustrated embodiment the conveyor support 18 is coupled to the conveyor 12 at a location between the feed and discharge ends 20, 22. Alternatively, the conveyor support 18 may be coupled to the conveyor 12 at any other location spaced apart (along the longitudinal axis of the conveyor) from the feed end 20 of the conveyor 12. The conveyor support 18 may take any suitable form, for example comprising a frame (as illustrated) and/or one or more support members. Conveniently, the conveyor support 18 is telescopically extendible.

Figure 2:
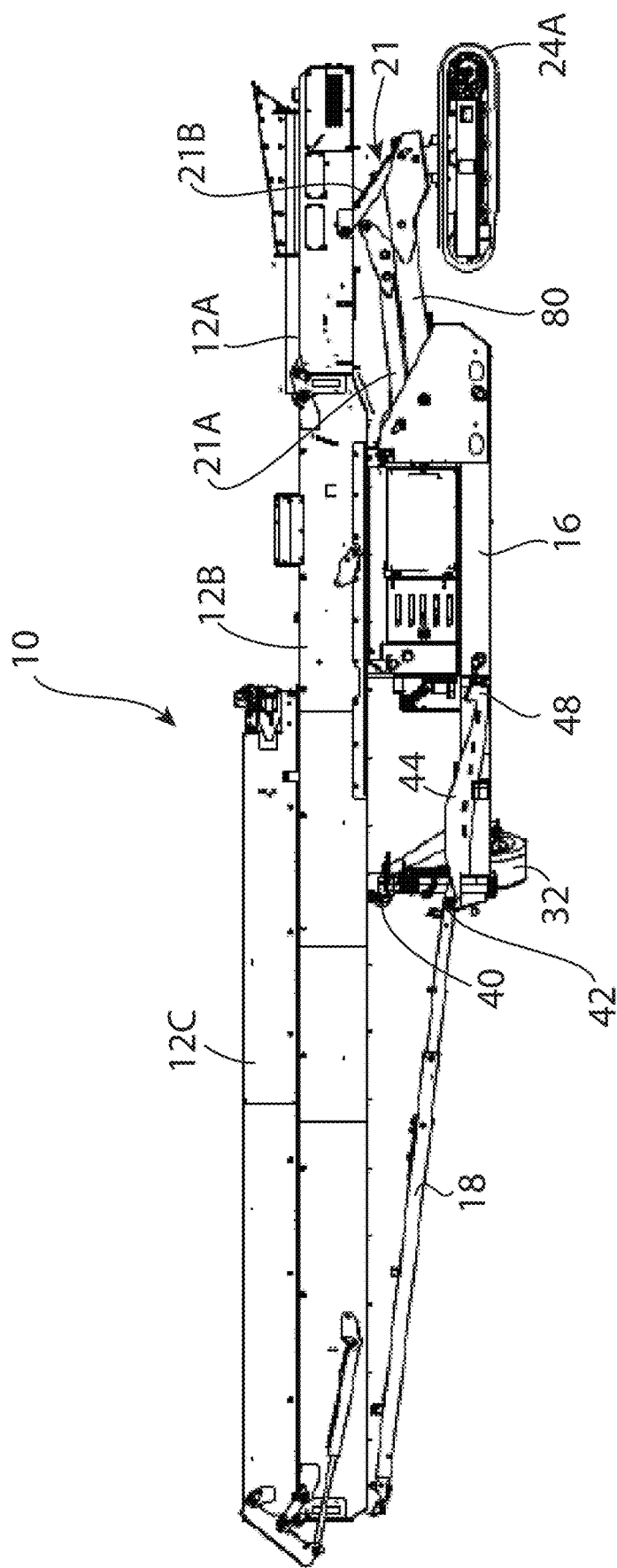
FIG. 2 is a side view of the apparatus of FIG. 1 shown in a first intermediate state between the deployed state and a transport state.
Figure 3:
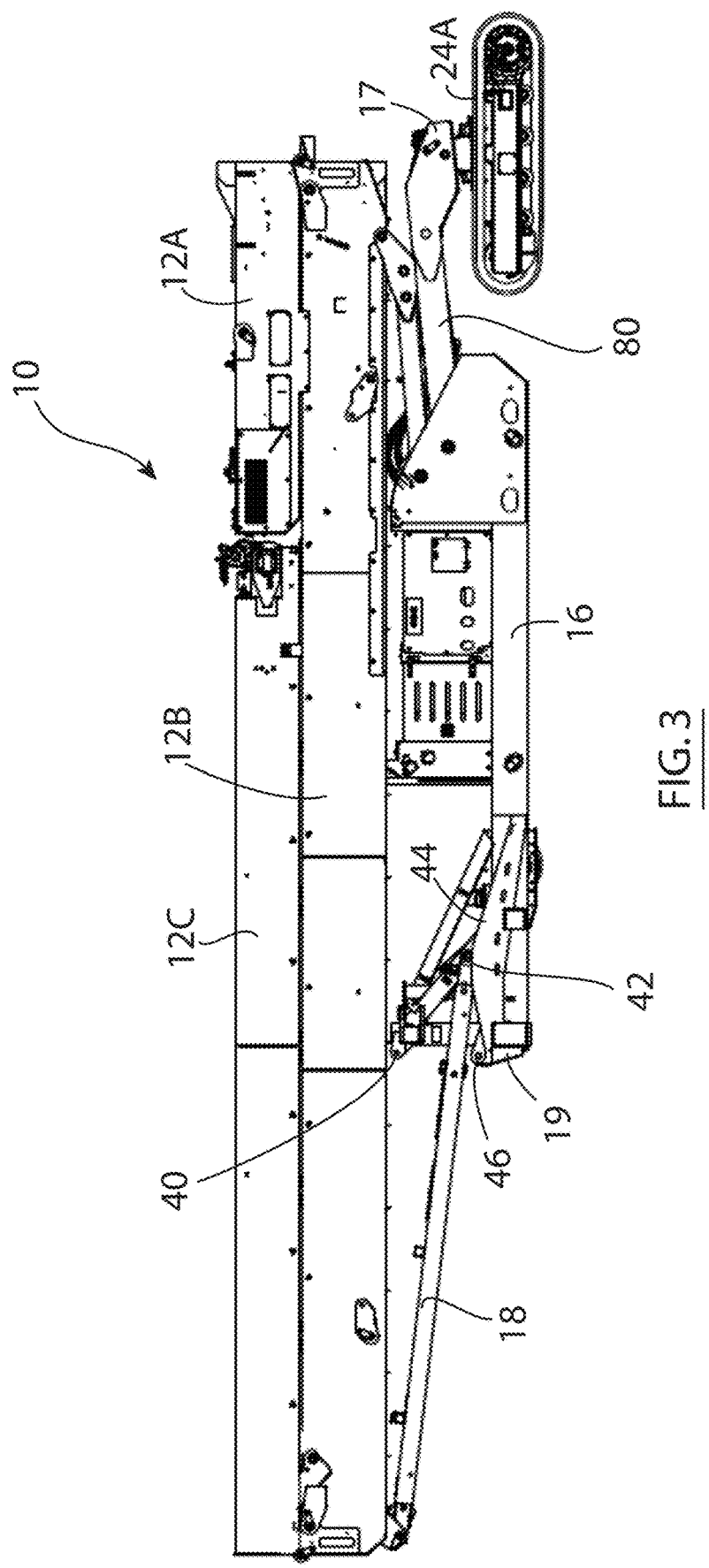
FIG. 3 is a side view of the apparatus of FIG. 1 in a second intermediate state between the deployed state and the transport state.

The conveyor 12 is extendible/retractable by virtue of comprising at least one foldable conveyor portion. In the illustrated embodiment, the conveyor 12 has a base conveyor portion 12A (which in this example includes the feed end 20), a mid-portion 12B and a head portion 12C. The head portion 12C and base portion 12A are each pivotably coupled, e.g. via one or more hinges, to the mid-portion 12B so that they may each be folded between a deployed state (FIG. 1) for use and a folded state (FIG. 2 shows the head portion 12C in its folded state while FIG. 3 shows both the head portion 12C and the base portion 12A in their folded states) for storage and transport. Conveniently, the head portion 12C and base portion 12A may be folded on top of the mid-section 12B, e.g. about a pivot axis that runs perpendicular to the longitudinal axis of the conveyor 12. Any conventional folding mechanism (e.g. comprising hydraulic ram(s) coupled to a linkage) may be provided to effect folding and unfolding of the foldable portion 12B. In this example, the conveyor support 18 is coupled to the conveyor 12 at an end of the mid-portion 12B distal the base portion 12A. In alternative embodiments one or more portions of the conveyor 12 may be telescopically extendible/retractable, as well as or instead of having one or more folding portion. For example, the head portion 12C and/or the base portion 12A may be telescopically extendible with respect to the mid-portion 12B. In other embodiments (not illustrated), the conveyor 12 may have only one extendible/retractable portion, or may have more than two extendible/retractable portions.

The chassis 16 carries a first set of one or more ground-engaging wheel assemblies 24A, 24B, typically being located at the first end 17 of the chassis 16. In the illustrated example, first and second track type wheel assemblies 24A, 24B are provided although in alternative embodiments one or more simple (non-track) wheels may be used.

The chassis 16, and therefore the conveyor 12, is pivotable about an in-use vertical axis (i.e. an axis that is perpendicular with the ground surface upon which the apparatus 10 is supported). This vertical axis is typically located at the first end 17 of the chassis 16. To this end, in the illustrated embodiment, the first end 17 of the chassis 16 is pivotably coupled to the wheel assemblies 24A, 24B, which are typically provided as part of a bogie. Hence, the chassis 16 and conveyor 12 are able to pivot relative to the wheel assemblies 24A, 24B, or bogie, about a vertical axis at the first end 17. This pivoting movement may be referred to as radial movement.

Second and third wheel assemblies 30A, 30B are coupled to the chassis 16, one on either side of the chassis 16. Each wheel assembly 30A, 30B comprises one or more wheels (which may optionally be of the track type). The wheel assemblies 30A, 30B are spaced apart from the wheel assemblies 24A, 24B along the longitudinal axis of the chassis 16. Conveniently, the wheel assemblies 30A, 30B are coupled to the chassis 16 at its second end 19. The wheel assemblies 30A, 30B facilitate the radial movement of the chassis 16 as is described in more detail hereinafter. The wheel assemblies 30A, 30B are preferably provided in a manner such that they mirror each other, or are at least capable of mirroring each other, with respect to the longitudinal axis of the chassis 16. Conveniently, the wheel assemblies 30A, 30B are the same as each other (other than to the extent that they may in some respects be mirror images of each other to account for their location on opposite sides of the chassis 16). Accordingly any descriptions herein of either one of the wheel assemblies 30A, 30B applies to the other. Moreover, while it is preferred to provide a respective one of the wheel assemblies 30A, 30B on each side of the chassis 16, it is possible in alternative embodiments to provide a wheel assembly 30A, 30B on only one side.

Figure 4:
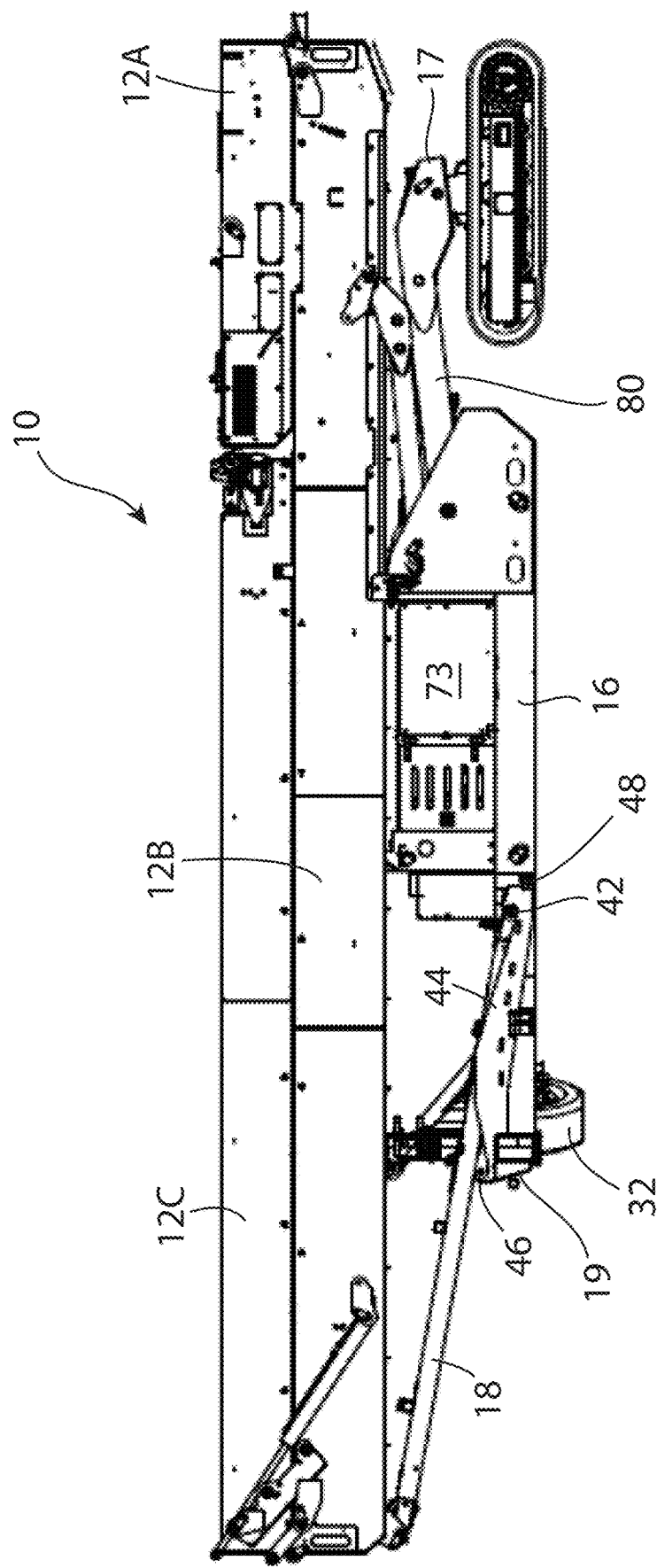
FIG. 4 is a side view of the apparatus of FIG. 1 shown in the transport state.

The conveyor apparatus 10 is operable between a use state (FIG. 1) and a transport state (FIG. 4). In the use state, the conveyor 12 typically extends obliquely upwards with respect to the longitudinal axis of the chassis 16, with its feed end 20 at a relatively low level (typically at or adjacent chassis-level) and its discharge end 22 at a relatively raised level. The height of the discharge end 22 and the pitch of the conveyor 12 are determined by the conveyor support 18, and can be increased or decreased by changing the length of the conveyor support 18. Where applicable, the conveyor 12 is extended or unfolded in the use state. In the use state, the conveyor 12 is supported with respect to the chassis 16 by the conveyor support 18 and by the second support structure 21 at the end 17 of the chassis 16.

In the transport state, the conveyor 12 is moved closer to the chassis 16 than when in the use state, preferably being located on top of the chassis 16 and extending substantially parallel with the longitudinal axis of the chassis 16. Where applicable, the conveyor 12 is retracted or folded in the transport state.

Figure 9:
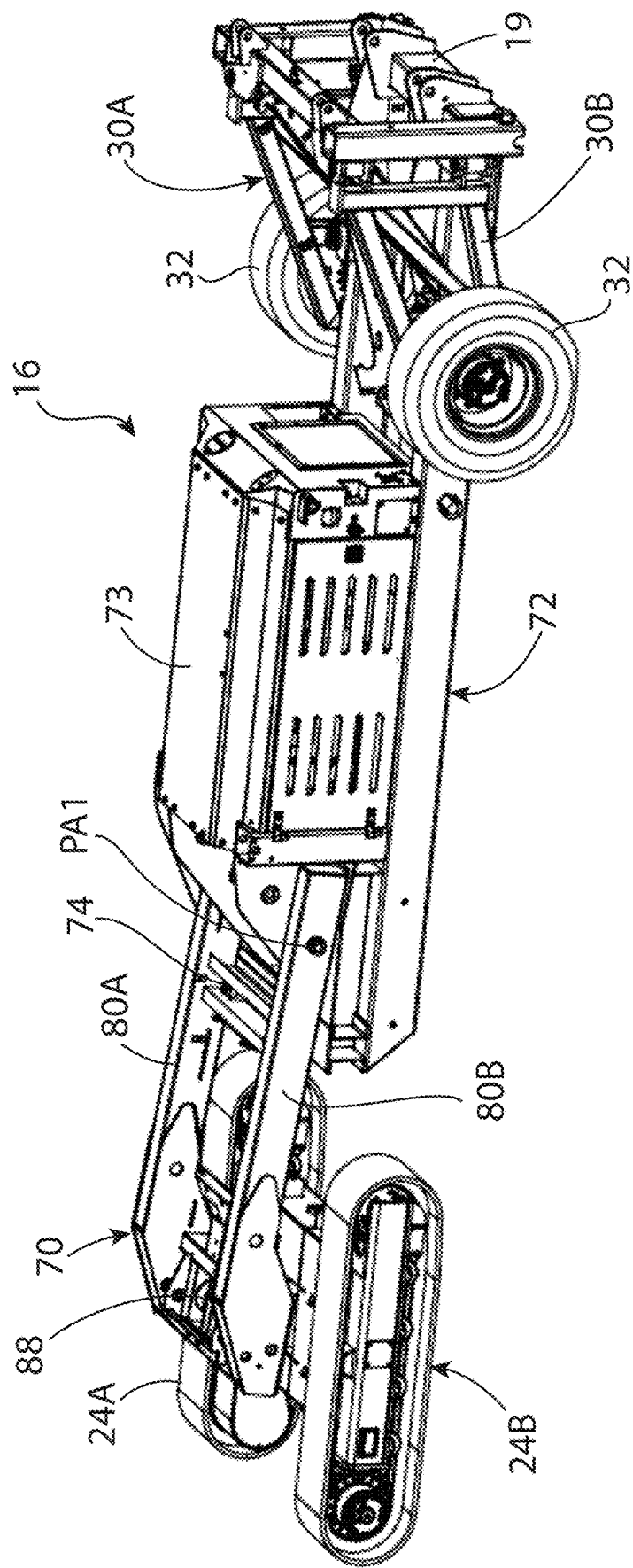
FIG. 9 is a perspective view of the chassis of FIG. 8 shown in a lowered state.

The wheel assemblies 30A, 30B are each operable between a radial state (FIG. 1) and a transport state (FIG. 9). In the radial state, the wheel assemblies 30A, 30B facilitate the radial movement of the chassis 16. To this end, the rotational axis of each wheel assembly 30A, 30B is radially displaced from the longitudinal axis of the chassis 16. In the transport state of the wheel assemblies 30A, 30B, the rotational axis of each wheel assembly 30A, 30B is perpendicular with the longitudinal axis of the chassis 16 to facilitate movement of the chassis 16, and therefore of the apparatus 10, in the longitudinal direction. Accordingly, in the transport state, the apparatus 10 is amenable to being towed or pushed, or even of being driven in cases where it is self-propelled.

To effect the radial and transport states, the wheel assemblies 30A, 30B are movable with respect to the chassis 16 between a deployed state (FIG. 1) and a non-deployed state (FIG. 9). Preferably, each wheel assembly 30A, 30B is pivotably coupled to the chassis 16 to allow it to pivot between its deployed and non-deployed states about an in-use vertical axis. Each wheel assembly 30A, 30B comprises one or more wheels 32 rotatably mounted on a wheel support structure 34. The wheel support structure 34 is pivotably coupled to the chassis 16 to allow the wheel assembly 30A, 30B to pivot between the deployed and non-deployed states about an in-use vertical axis. In the deployed state the wheel support structure 34 projects outwardly away from the chassis 16 (typically extending obliquely to the longitudinal axis of the chassis) to hold the wheel(s) 32 at a location that is laterally spaced apart from the respective side of the chassis 16 (and such that their rotational axis is radially displaced from the longitudinal axis of the chassis 16). In the non-deployed state the wheel support structure 34 is folded alongside the chassis 16 (typically extending parallely or substantially parallely to the longitudinal axis of the chassis) to locate the wheel(s) 32 adjacent the respective side of the chassis 16 such that their rotational axis is perpendicular with the longitudinal axis of the chassis 16.

Referring in particular to FIGS. 2 to 7, a preferred embodiment of one aspect of the invention is described in which the conveyor 12 is movable axially with respect to the chassis 16 in order to reduce the overall length of the apparatus 10 in the transport state. In particular the conveyor 12 is movable, preferably linearly, in a direction parallel with the longitudinal axis of the chassis 16. The movement may be sliding movement, for example being facilitated by roller(s) and/or slide(s). In preferred embodiments, the conveyor 12 is also foldable to reduce its length in the transport state. It will be understood however that in alternative embodiments, the conveyor 12 may be extendible/retractable by means of one or more telescopic portion as well as, or instead of, one or more folding portion, while still being axially movable in the manner described herein.

In FIG. 2, the conveyor 12 is in a non-elevated state in which it is disposed substantially parallel with the longitudinal axis of the chassis 16. The head portion 12C is folded onto the mid-portion 12B. The conveyor 12 rests on the chassis 16 so that the conveyor support 18 and the support structure 21 are not required to bear the weight of the conveyor 12. In particular it is preferred that the conveyor 12 rests on one or more rollers 40 (see in particular FIG. 7) that are coupled to the chassis 16. It is preferred that there are at least two sets of one or more rollers 40, the sets being spaced apart in the longitudinal direction of the chassis 16. In the illustrated embodiment, there are two sets of rollers 40 provided at locations A and B on FIG. 2. In this example, each set of rollers 40 comprises two rollers, one for supporting each side of the conveyor 12. Not only do the rollers 40 support the conveyor 12 but they also facilitate linear movement of the conveyor 12 with respect to the chassis 16 in the longitudinal direction. Alternatively, or in addition, one or more slide mechanisms (not illustrated) may be provided for facilitating linear movement of the conveyor 12 in the longitudinal direction.

Assuming that the chassis ends 19, 17 are at the front and rear of the chassis 16 respectively, in FIG. 2, the conveyor 12 is in a relatively forward position with respect to the chassis 16. As can be seen from FIGS. 3 and 4, to adopt the transport state the conveyor 12 moves rearward from the forward position with respect to the chassis 16, as is described in more detail hereinafter.

When the conveyor 12 is in use, the couplings between the conveyor 12 and the chassis 16 provided by the conveyor support 18 and the support structure 21 hold the conveyor 12 in a fixed axial position relative to the chassis 12 but allow the pivoting movement that is required to raise and lower the conveyor 12. In order to facilitate axial movement of the conveyor 12 with respect to the chassis 16, these couplings are reconfigured or decoupled as is convenient. In preferred embodiments, the support structure 21 is decoupled from the conveyor 12 and/or the chassis 16 as is convenient. For example the pivotable link(s) 21A and extendable structure 21B may be disconnected from the conveyor 12. Similarly, either or both ends of the conveyor support 18 may be disconnected from the conveyor 12 or chassis 16 as applicable. In preferred embodiments, the coupling at lower end 42 of the support structure 18 is decoupled to allow relative movement between the end 42 and the chassis 16 in the longitudinal direction as is now described in more detail with particular reference to FIG. 5.

Figure 5:
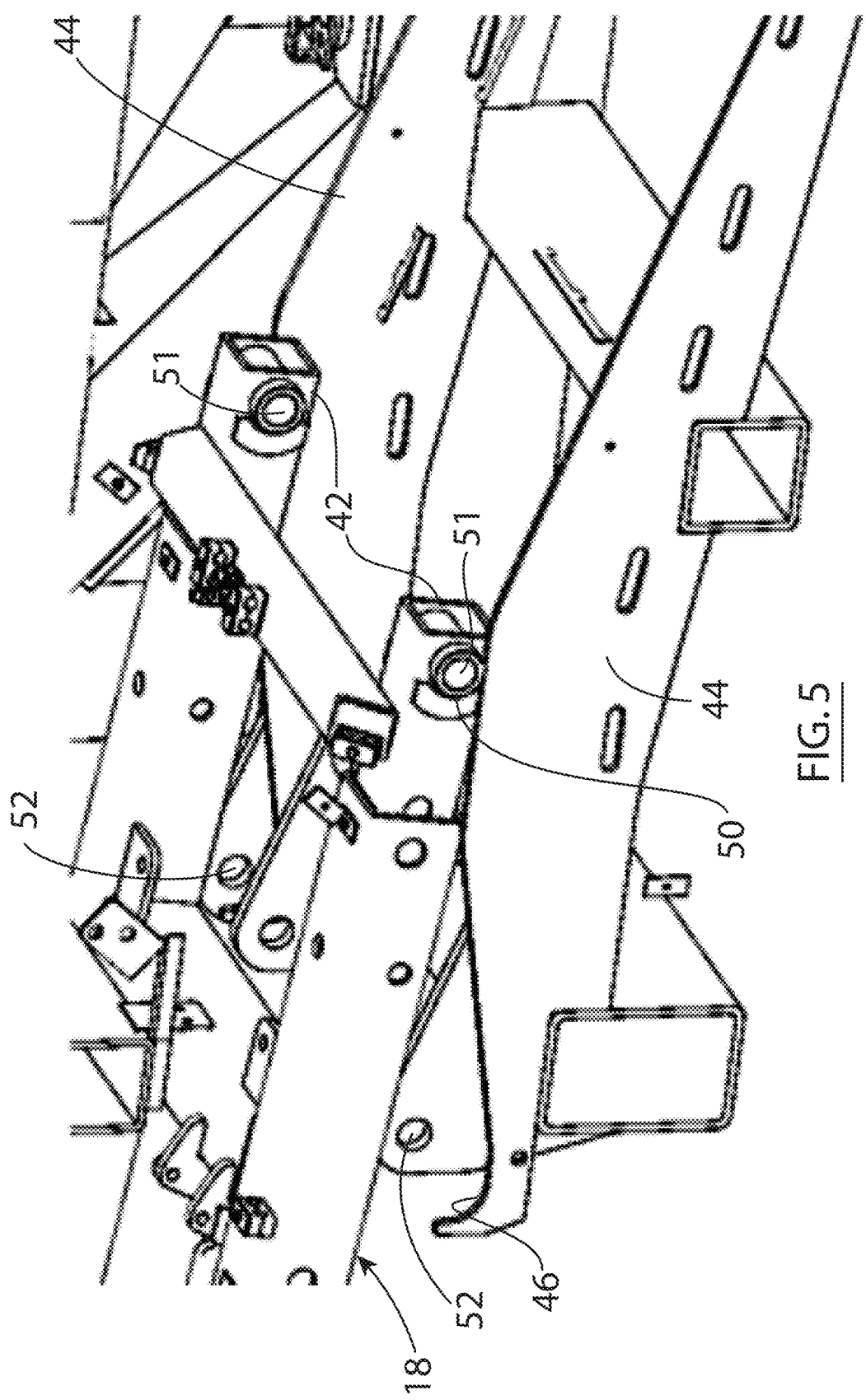
FIG. 5 is a detail view of part of the apparatus of FIG. 1 when in said second intermediate state.
Figure 6:
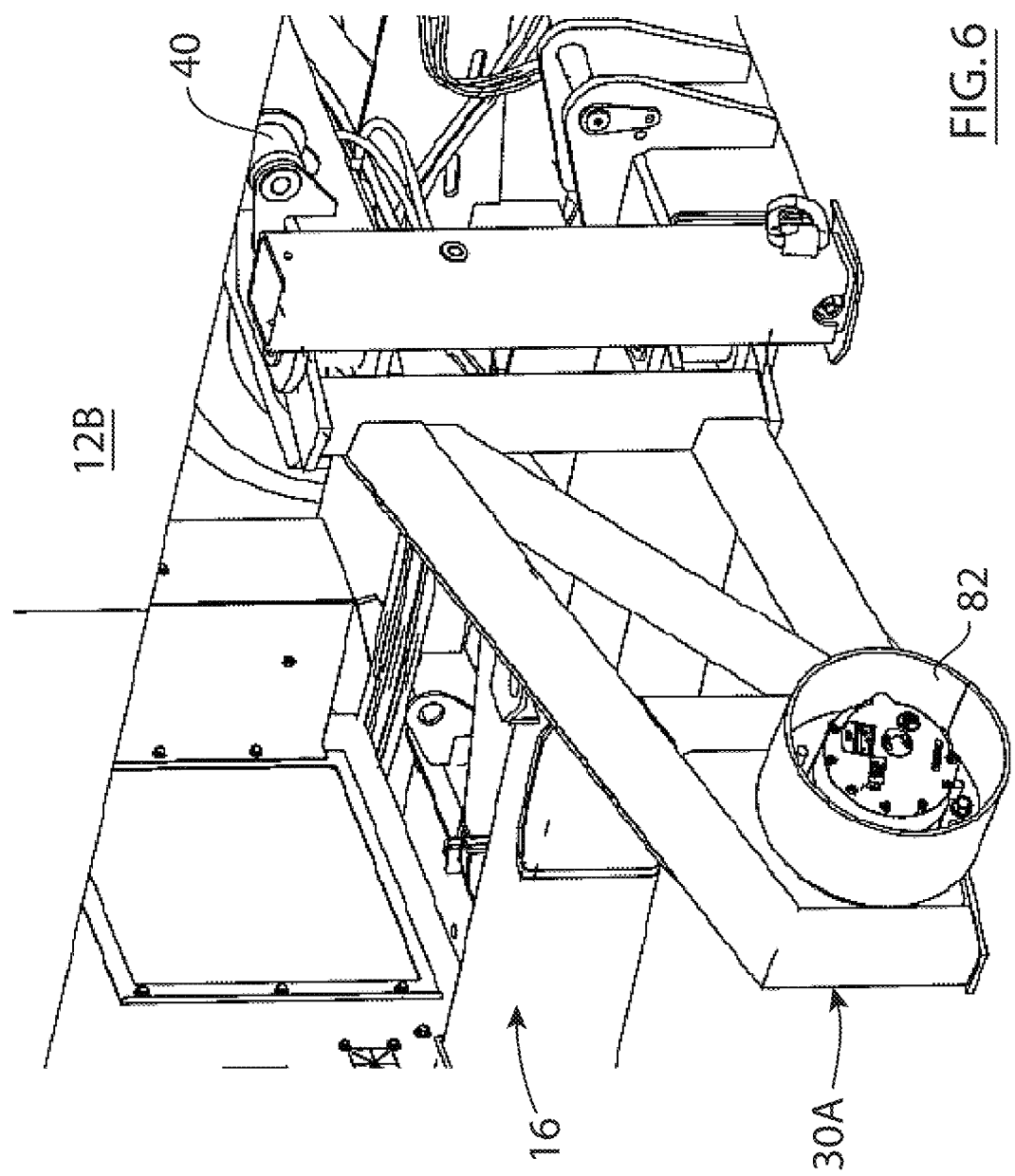
FIG. 6 is a detail view of part of the apparatus of FIG. 1 showing in particular a roller.

As may best be seen from FIG. 5, the end 42 of conveyor support 18 is coupled to one or more track 44 provided on the chassis 16. The track 44 runs longitudinally of the chassis 16 and has a forward end 46 and a rearward end 48 (not visible in FIG. 5). The end 42 of the conveyor support 18 includes one or more bearing 50 for riding along the track 44. The bearing(s) 50 may for example comprise a boss or other protrusion from the support 18, or a roller. During normal use of the apparatus 10, the end 42 is located and fixed at the forward end 46 of the track 44, and is pivotably coupled to the chassis 16 to facilitate raising and lowering of the conveyor 12. When the apparatus 10 is moving into or out of the transport state, the support end 42, facilitated by the bearing(s) 50 is movable along the track 44 from end 46 to end 48. Preferably the rearward end 48 of the track 44 comprises a seat or other stop 54 that prevents further movement of the bearing(s) 50 in the rearward direction. The track 44 may have a profile between ends 46, 48 shaped to guide (i.e. lift and/or lower) the support end 42 past other components of the apparatus 10 as required.

Conveniently, the bearing 50 is part of the pivotable coupling between the conveyor support 18 and the chassis 16 when the chassis 16 is in its deployed state. For example, the bearing 50 may include a socket 51 that aligns with a corresponding socket 52 provided on the chassis 16 when the support end 42 is located at the forward end 46 of the track 44. When aligned, a pin (not shown) may be inserted into the sockets 51, 52 to fix the support end 42 at the track end 46 and to create a pivotable coupling. The pin may be removed to allow the support end 42 to move along the track 44 when required.

In the illustrated embodiment, the end 42 of the conveyor support 18 is comprised of the respective end of two spaced apart bars, each having a respective bearing 50 for running in a respective parallel track 44.

Figure 7:
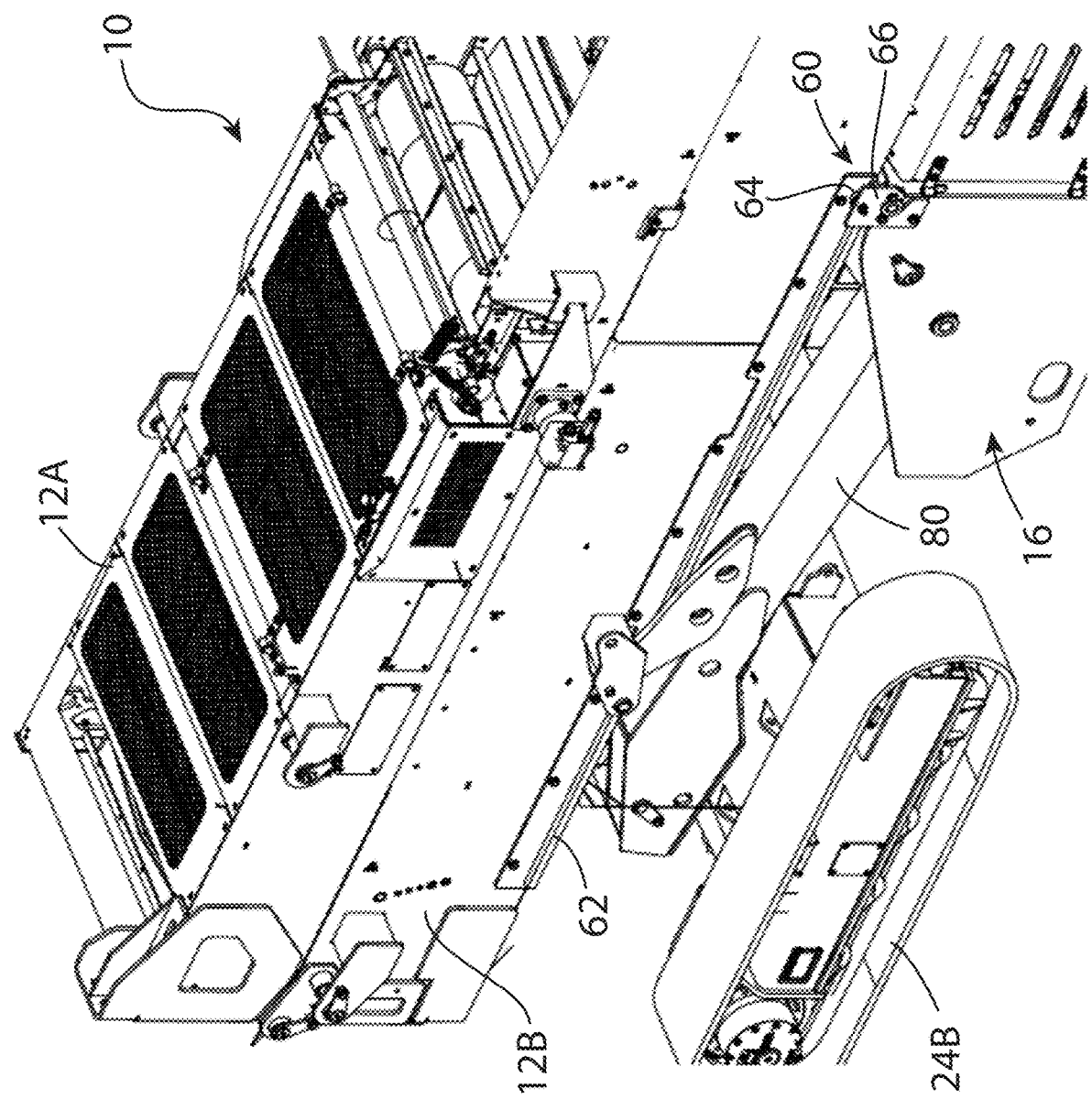
FIG. 7 is a detail view of part of the apparatus of FIG. 1 in said transport state.

Referring now in particular to FIG. 7, in preferred embodiments, one or more retaining mechanisms 60 are provided for retaining the conveyor 12 on the chassis 16 during linear movement of the conveyor 12. In the illustrated embodiment, the retaining mechanism 60 comprises a track 62 provided on the conveyor 12 and running in the longitudinal direction. A corresponding bearing 64, which preferably comprises a roller, is provided in a fixed position on the chassis 16 for running along the track 62 as the conveyor 12 moves longitudinally with respect to the chassis 16. The engagement between the bearing 64 and the track 62 acts to retain the conveyor 12 on the chassis 16. The bearing 64 is removably mounted on the chassis 16, for example being carried by a removable plate or other base 66 in the illustrated embodiment. In the normal working mode of the apparatus 10, the bearing 64 is removed to allow the conveyor 12 to be raised and lowered with respect to the chassis 16. Preferably a respective track and bearing assembly is provided at each side of the conveyor 12.

Starting from the deployed state (FIG. 1), when it is desired to configure the apparatus 10 for transport, the conveyor 12 is lowered until it rests on the chassis 16 (FIG. 2). Typically, this lowering is achieved by contracting the conveyor support 18. The support structure 21 is then decoupled to allow longitudinal movement of the conveyor 12 with respect to the chassis 16. The length of the conveyor 12 is shortened, which in the present embodiment involves folding the head portion 12C and base portion 12A onto the mid-portion 12B. In alternative embodiments, shortening the conveyor 12 may involve folding just one portion, or more than one portion, and/or telescopically contracting one or more portions as applicable.

The conveyor 12 is moved rearwardly with respect to the chassis 16 (as can be appreciated from a comparison of FIGS. 2, 3 and 4). Typically, the conveyor 12 is moved rearwardly until the rearward end of the mid-portion 12B is substantially in register with the rear end of the chassis 16. The shortening of the conveyor 12 may be performed before, during or after the rearward movement of the conveyor 12, as is convenient.

In preferred embodiments, the rearward movement of the conveyor 12 is performed in first and second stages. In the first stage, the lower end 42 of the conveyor support 18 is pivotably coupled to the chassis 16, i.e. not decoupled as described above. Accordingly, rearward movement of the conveyor 12 in the first stage involves further contraction of the conveyor support 18. Conveniently, rearward movement of the conveyor 12 in the first state is effected by powered contraction of the conveyor support 18. Alternatively, the conveyor support 18 may contract as the conveyor 12 is moved rearwardly by some other means, e.g. manually or by one or more other powered actuator or vehicle. In the second stage, the lower end 42 of the conveyor support 18 is decoupled from the chassis 16 to allow it to move along the track 44, and so to allow the conveyor support 18 to move rearwardly with the conveyor 12. During rearward movement of the conveyor 12 in the second stage, the end 42 of the support 18 moves along the track 44. In the preferred embodiment, the support end 42 moves from the forward end 46 to the rearward end 48 of the track 44. Conveniently, the stop 54 at the end 48 of the track limits not only movement of the support end 42 in the track 44 but also rearward movement of the conveyor 12. During the second stage, the conveyor 12 may be moved manually or by one or more powered actuator or a vehicle (e.g. a forklift or loading vehicle), as is convenient.

In the transport state (FIG. 4), the apparatus 10 is relatively compact in the longitudinal direction as a result of the longitudinal movement of the conveyor 12, preferably such that its end is substantially in register with the end of the chassis 16, and its support structure 18, and typically also as a result of the folding or other contraction of the conveyor 12 itself. In the transport state, the wheel assemblies 30A, 30B are in their non-deployed state, extending alongside the chassis 16 such that the rotational axis of the wheels 32 is perpendicular with the chassis 16.

In order to deploy the conveyor 12 from the transport state, the conveyor 12 is moved forwards until the support end 42 reaches the track end 46, whereupon the support end 42 is coupled to the chassis 16 to create a pivot joint. Advantageously, this forward movement of the conveyor 12 may be effected by extending the conveyor support 18, since the support end 42 abuts against the stop 54. In this case, the conveyor support 18 may then be contracted so that the end 42 reaches the track end 46. Alternatively, or in addition, further forward movement of the conveyor 12 may be effected by extending the conveyor support 18 after the pivot joint is established. Once the foremost position of the conveyor is reached, the support structure 21 is re-connected such that further extension of the conveyor support 18 causes the conveyor 12 to be raised.

Figure 8:
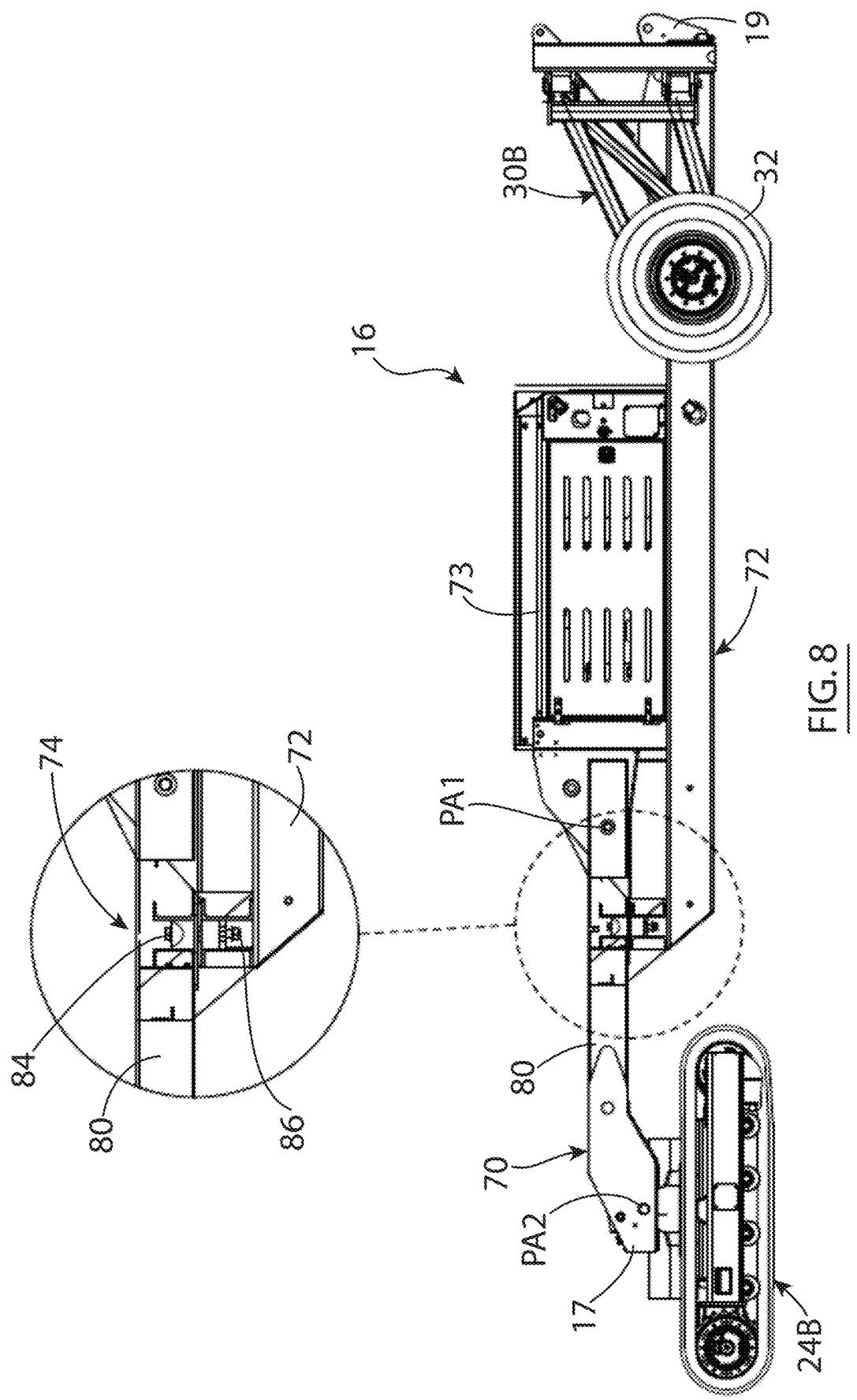
FIG. 8 is a side view of a chassis for the apparatus of FIG. 1, the chassis being shown in an operating state.
Figure 10:
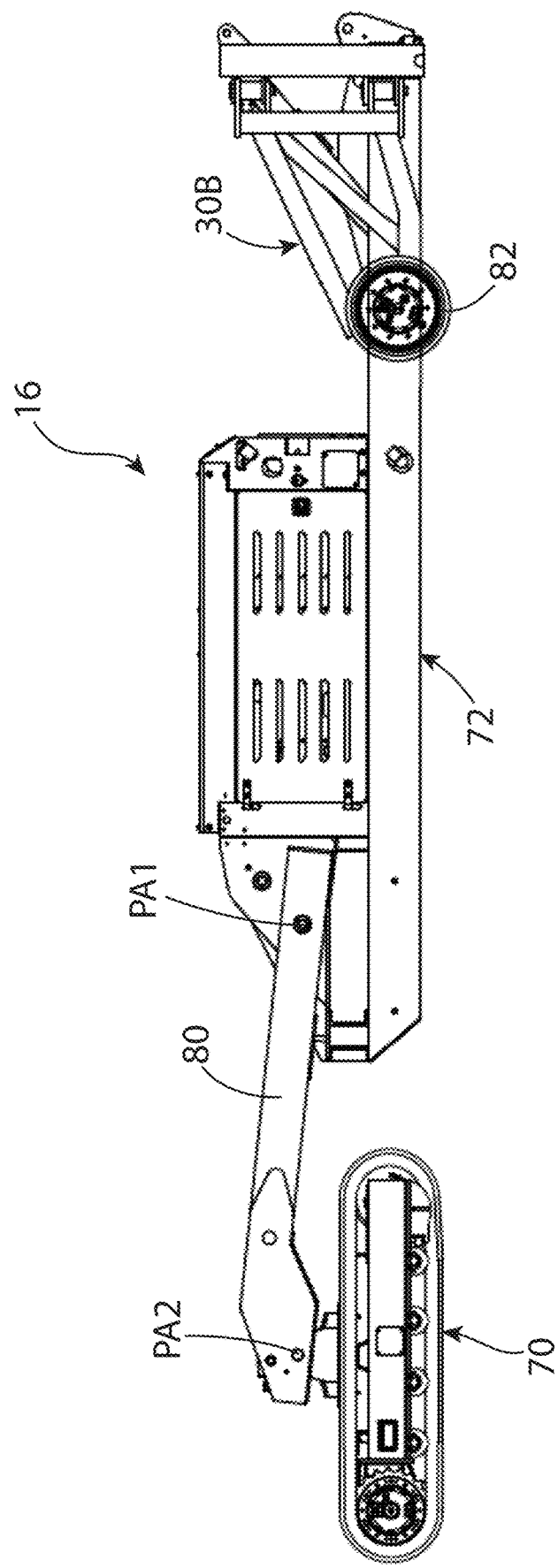
FIG. 10 is a side view of the chassis of FIG. 8 shown in the lowered state with replacement wheels.

Referring now in particular to FIGS. 8 to 10 the preferred chassis 16 is described, embodying another aspect of the invention, and which may be used in the radial conveyor 10 together with the longitudinally movable conveyor 12 described with reference to FIGS. 2 to 7, or may be used separately, for example with other chassis-based apparatus, e.g. conveyors (radial or otherwise), other material processing apparatus (e.g. screening machines, crushing machines, washing machines and/or recycling machines).

The chassis 16 comprises a first part 70 coupled to a second part 72, which may conveniently be referred to as the rear part 70 and the front part 72, to allow relative pivoting movement between the parts 70, 72 that in turn allows an intermediate portion of the chassis 16 to be raised or lowered. In the illustrated embodiment, the second chassis part 72 carries a power plant 73, which may for example include any one or more of a hydraulic power system, and electrical power system, an engine, and/or controllers as required.

The preferred coupling between the chassis parts 70, 72 includes a pivot axis PA1 that runs transversely of the chassis 16, perpendicular to the longitudinal axis of the chassis 16. Any suitable conventional pivot joint, hinge or coupling mechanism may be used to provide the coupling at pivot axis PA1. The coupling between the chassis parts 70, 72 further includes a locking device 74 that is operable between a locking mode in which it prevents the chassis parts 70, 72 from pivoting about the pivot axis PA1, and an unlocked mode in which the chassis parts 70, 72 are able to pivot about the pivot axis PA1. Pivoting of the chassis parts 70, 72 about the pivot axis PA1 allows the intermediate section of the chassis 16 (i.e. a section between the ends 17, 19) to be raised or lowered with respect to a ground surface. In particular, pivoting about axis PA1 allows the chassis 16 to adopt an operating state (FIG. 8), in which its intermediate section is relatively raised with respect to the ground surface, and a lowered state (FIGS. 9 and 10) in which its intermediate section is relatively low with respect to the ground surface. In its locking mode, the locking device 74 locks the chassis in the operating state and provides a rigid connection between the chassis parts 70, 72. In the unlocking mode, the locking device 74 allows the chassis parts 70, 72 to adopt the lowered state.

In typical embodiments, each chassis part 70, 72 includes one or more wheel assemblies. The pivot axis PA1 is typically located between the wheel assembly(s) of the first chassis part 70 and the wheel assembly(s) of the second chassis part 72. In preferred embodiments, the second chassis part 72 has a wheel axis that is (or is configurable to be) parallel with the pivot axis PA1 and spaced apart from the pivot axis PA1 in the longitudinal direction. When the locking device 74 is unlocked, the second chassis part 72 is able to pivot about the wheel axis with respect to the first chassis part 70. In particular, the end of the second chassis part 72 that is coupled to the first chassis part 70 is able to be lowered and raised. Accordingly, the intermediate section of the chassis 16 can be lowered and raised. In preferred embodiments, the second chassis part 72 is configured such that its centre of mass is located on the same side of its wheel axis as the pivot axis PA1. In preferred embodiments, the pivot axis PA1 is higher than the wheel axis.

In the illustrated embodiment, the first chassis part 70 comprises the wheel assemblies 24A, 24B, which are typically provided as part of a bogie. The second chassis part comprises the wheel assemblies 30A, 30B. In alternative embodiments, either one or both of the chassis parts 70, 72 may comprise one or more wheel assembly of any conventional type.

In preferred embodiments, the first chassis part 70 includes a link structure 80 that is pivotably coupled to the second chassis part 72 for pivoting about pivot axis PA1. The link structure 80 is pivotably coupled to the first chassis part 70 for pivoting about a second pivot axis PA2. The pivot axes PA1, PA2 are longitudinally spaced apart and parallel with one another, each running transversely of the chassis 16, perpendicular to the longitudinal axis of the chassis 16. Any suitable conventional pivot joint or coupling mechanism may be used to provide the coupling at pivot axes PA1 and PA2. The link structure 80 is preferably rigid. The link structure 80 may take any suitable form. In preferred embodiments, the link structure 80 comprises a frame having spaced apart parallel, longitudinally extending arms 80A, 80B.

In preferred embodiments, the locking device 74 is coupled between the link structure 80 and the second chassis part 72. In the locking mode, the locking device 74 rigidly fixes the link structure 80 with respect to the second chassis part 72 preventing pivoting of said link structure 80 or the second chassis part 16 about the pivot axis PA1. In the unlocked mode, the locking device 74 permits pivoting of said link structure 80 and the second chassis part 16 about the pivot axis PA1. In alternative embodiments, the locking device 74 may be provided in any other suitable location, e.g. being incorporated into the pivot coupling that facilitates pivoting about axis PA1.

In preferred embodiments, the second pivot axis PA2 is located above the wheel assembly(s) (which comprise tracks in typical embodiments) of the first chassis part 70, in the present example being above the wheel assemblies 24A, 24B (and bogie). In preferred embodiments, the link structure 80 pivots downwardly as the chassis 16 moves from the operating state to the lowered state, and moves upwards as the chassis 16 moves from the lowered state to the operating state. In typical embodiments, in the operating state of the chassis 16 with the locking device 74 in the locking mode, the link structure 80 extends substantially parallel with the longitudinal axis of the chassis 16, while in the lowered state the link structure 80 extends downwards from said second pivot axis PA2, oblique to said longitudinal axis.

In preferred embodiments, in the transport state, the wheels 32 of the front wheel assemblies 30A, 30B that are used in the operating state are removed and replaced with wheels 82 of a smaller diameter (see FIG. 10), or other lowering track or runner. The smaller wheels 82 reduce the height of the chassis 16, and therefore of the apparatus 10 of which the chassis is part, in particular at the front.

The locking device 74 may take any suitable form, for example comprising one or more bolts, nuts, clamps, clips, actuators or the like. In preferred embodiments, the locking device 74 comprises one or more bolt 84 with corresponding nut 86 for coupling the first and second chassis parts 70, 72 together. In preferred embodiments, the, or each, bolt 84 couples the link structure 80 to the second chassis part 72. Advantageously each bolt 84 is vertically disposed, i.e. perpendicular to the longitudinal and transverse directions of the chassis 16. When the nut 86 is tightened, the bolt 84 creates a rigid connection between the chassis parts 70, 72 thereby maintaining the chassis 16 in its operating state. When the nut 86 is loosened relative pivoting movement between the chassis parts 70, 72 is allowed. With the preferred vertical orientation of the bolt 84, the position of the nut 86 on the bolt 84, when loosened, determines the amount of pivoting movement that is allowed. Preferably, the bolt 84 is long enough that the nut 86 can be positioned on the bolt 84 to allow the full range of pivoting movement between the operating and transport states. Accordingly, the, or each, bolt 84 and nut assembly 86 may be used to control movement of the chassis parts 70, 72 between the operating and transport states. For example, an operator (not shown) can cause the chassis 16 to transition from the operating state to the transport state by loosening the nut 86 and to transition from the transport state to the operating state by tightening the nut 84 (typically using a suitable power tool).

It will be apparent from the foregoing that preferred embodiments of the invention allow a chassis and/or an apparatus comprising a chassis to be reduced in length and/or height in order to facilitate transport (or storage), especially in a standard container. Moreover, transitioning the chassis/apparatus into and out of its transport state does not require significant disassembly of the chassis/apparatus, nor does it require the use of lifting equipment such as a crane.

Figure 11:
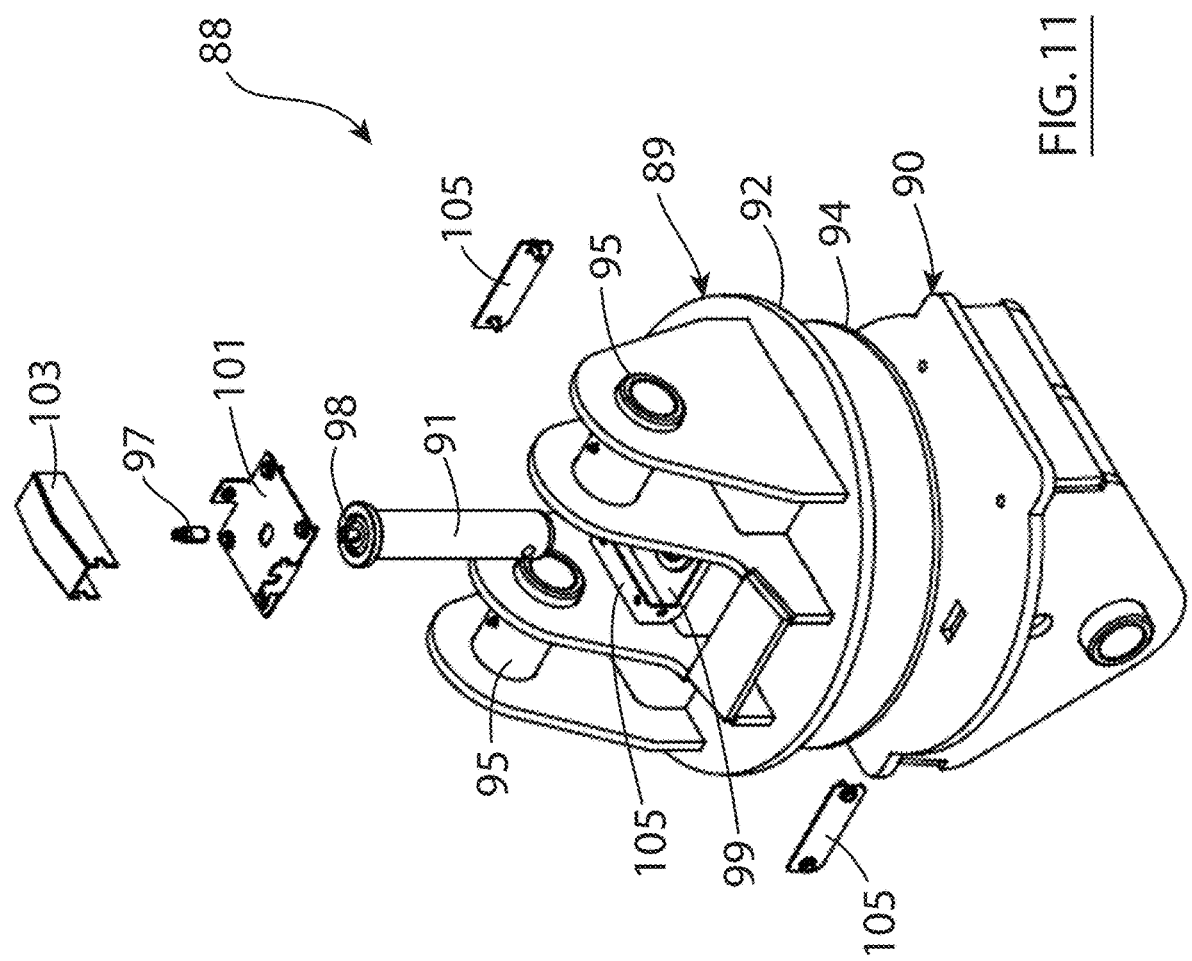
FIG. 11 is an exploded perspective view of a radial joint including a radial position sensing system.
Figure 12:
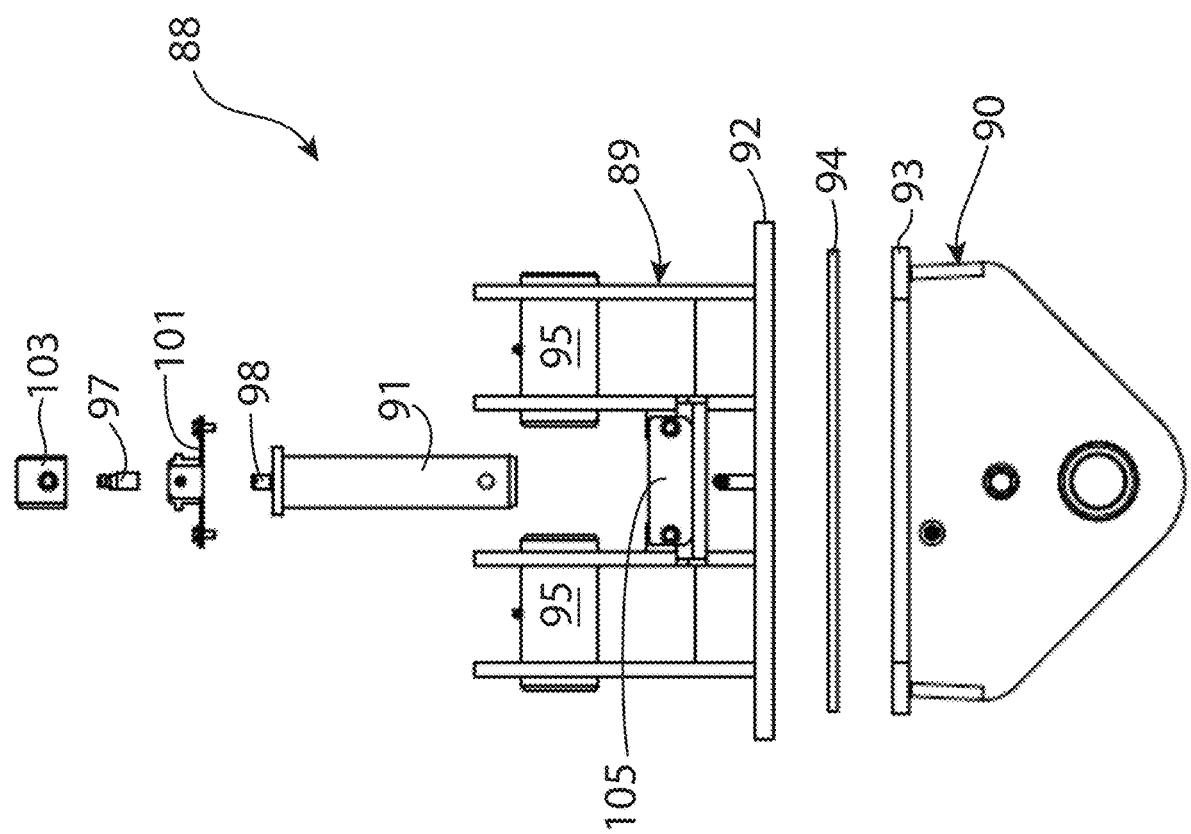
FIG. 12 is an exploded side view of the radial joint of FIG. 11.
Figure 13:
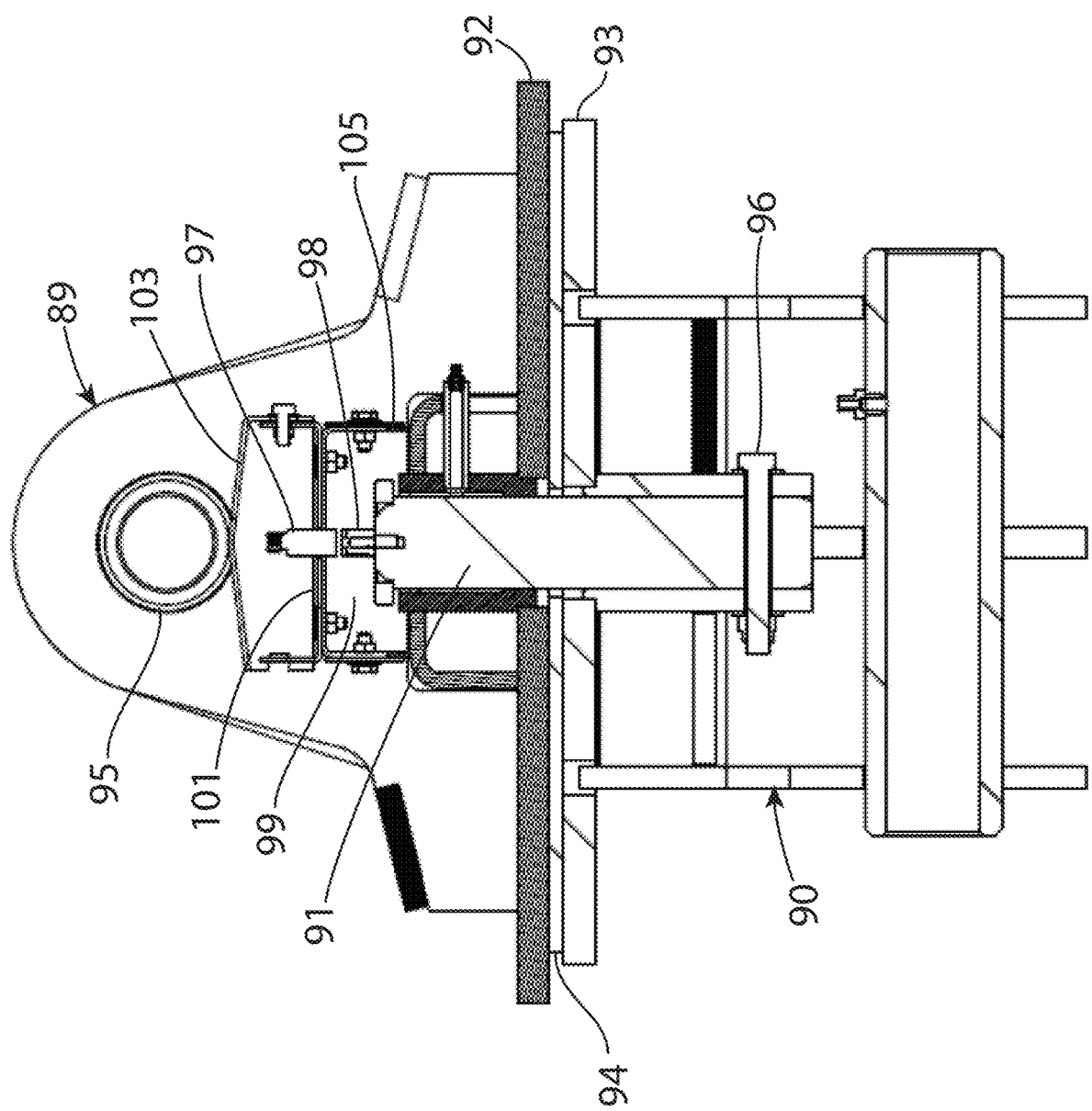
FIG. 13 is a sectioned side view of the radial joint of FIG. 11.

Referring now in particular to FIGS. 11 to 13, there is shown a preferred pivot joint 88, embodying another aspect of the invention, which is suitable for use in radial conveyors, including the radial conveyor 10, particularly but not exclusively for coupling the front and rear chassis parts 72, 70 of the conveyor apparatus 10. In the context of a radial conveyor, the pivot joint 88 couples the radially movable conveyor 12 and chassis 16 to a base part (which in the illustrated example is the bogie that includes the rear wheels) to allow relative pivoting movement about an in-use vertical axis, i.e. an axis that is perpendicular to the longitudinal and transverse directions of the chassis 16. Hence, the joint 88 facilitates the radial movement of the conveyor 12. In preferred embodiments where the chassis 16 is of the type illustrated in FIGS. 8 to 10, the joint 88 preferably also facilitates the pivoting between chassis parts 70, 72 that allows the chassis 16 to be raised and lowered as described above.

The preferred pivot joint 88 comprises an upper part 89 and a lower part 90 coupled together by a spindle 91. The spindle 91, which may comprise a pin, rod or other suitable component, defines a pivot axis about which the upper and lower parts 89, 90 can rotate relative to one another. When used in the radial conveyor 10, the pivot axis provided by the spindle 91 is the vertical axis about which the conveyor 12 and chassis 16 can move radially. Each joint part 89, 90 typically includes a plate 92, 93 (each having an aperture (not visible) for accommodating the spindle 91), the plates 92, 93 providing an interface between the joint parts 89, 90. Typically, a bearing 94 (having an aperture (not visible) for accommodating the spindle 91) is provided between the plates 92, 93. The bearing 94 may take any suitable form, e.g. plate or ring, and may optionally include ball bearings. In alternative embodiments the bearing 94 may be omitted in which case the plates 92, 93 may serve as bearing surfaces.

In preferred embodiments, the upper joint part 89 includes part of a second pivot joint. In the illustrated embodiment, the second pivot joint part comprises a sleeve bearing 95 for receiving a pivot pin (not shown). Alternatively, the upper joint part 89 may include a pivot pin for coupling with a sleeve bearing. In any event, in embodiments where the pivot joint 88 is provided on a chassis 16 of the type shown in FIGS. 8 to 10, the second pivot joint may provide the pivoting between chassis parts 70, 72 that allows the chassis 16 to be raised and lowered as described above. Optionally, the lower joint part 90 may be similarly provided with part of a third pivot joint.

In preferred embodiments, one of the joint parts 89, 90 is fixed with respect to the spindle 91, the other joint part 90, 89 being rotatable about the spindle 91. In the illustrated example, the spindle 91 is fixed to the lower part 90, e.g. by pin 96 or other convenient fixing, and the upper part 89 is rotatable about the spindle 91. When used in a radial conveyor, the lower joint part 90 is fixed to the non-radially moving base part (i.e. the bogie in the illustrated example), while the upper joint part 89 is fixed to the radially movable chassis/conveyor assembly.

The pivot joint 88 includes a rotation sensor 97, preferably an absolute rotation sensor, that is capable of detecting the rotational, or angular, position of the rotatable joint part 89 with respect to a reference position. The rotation sensor 97 may be of any conventional type, preferably but not necessarily a non-contact sensor. Examples of suitable sensors include optical rotation sensors (e.g. a reflective sensor, an interrupter sensor, or an optical encoder), or a magnetic sensor (e.g. a variable-reluctance (VR) sensor, eddy-current killed oscillator (ECKO) sensor, Wiegand sensor, or Hall-effect sensor). In the illustrated embodiment the sensor 97 is assumed to be a magnetic sensor.

The sensor 97 is configure to detect, and preferably to measure, rotational movement of the rotatable joint part 89 about the spindle 91. To this end, the sensor 97 may be provided on the rotatable joint part 89 and be directed at a target 98 provided on the spindle 91. Alternatively, the sensor 97 may be provided on the spindle 91 and be directed at a target 98 provided on the rotatable joint part 89. In preferred embodiments, the target 98 or the sensor 97, as applicable, is provided on the end of the spindle 91 that protrudes into the rotatable joint part 89, preferably on an end face (e.g. a top face in this example). Correspondingly, the sensor 97 or the target 98, as applicable, is provided on the rotatable joint part 89 at a location facing, and preferably adjacent, the end of the spindle 91. Preferably, whichever of the sensor 97 or target 98 is provided on the rotatable joint part 89 is located and positioned such that it is co-axial with the spindle 91. In the illustrated embodiment, the sensor 97 is provided on the rotatable joint part 89 and the target 98 is provided on the top of the spindle 91.

The rotatable joint part 89 preferably includes a cavity or space 99 into which the spindle 91 projects and in which its end is exposed, the sensor 97 and target 98 being located in the cavity/space 99. The sensor 97 may be supported by a mounting structure 101, e.g. a plate. The structure 101 may include a cover 103 for covering the sensor 97. Preferably, a housing structure 105 is provided around the cavity 99 to protect the sensing part of the sensor 97 and the target 98 from the external environment. Conveniently the mounting structure 101 serves as part of the housing structure 105.

In embodiments where the sensor 97 is a magnetic sensor, the target 98 may comprise a magnet, which may be mounted on or incorporated with the spindle 91 or rotatable joint part 89 as applicable. Calibration of the sensor 97 with respect to the reference position may be performed in any conventional manner, e.g. by aligning the sensor 97 with the magnetic poles of the magnetic target 98. In cases where the sensor 97 is optical, the target 98 may comprise one or more markings (not illustrated), and the sensor 97 may be calibrated with respect to the markings in any conventional manner.

In use, the rotation sensor 97 detects the angular position of the rotatable joint part 89 with respect to the reference position. In the context of the radial conveyor, the sensor 97 produces an output signal that may be used by a controller (not shown) to measure the radial position of the conveyor 12 and so used to control the radial movement of the conveyor 12. This eliminates the need to provide stops to limit the conveyor's radial movement.

The invention is not limited to the embodiment(s) described herein but can be amended or modified without departing from the scope of the present invention.

The invention claimed is:

1. A chassis for a material processing apparatus, the chassis comprising a first chassis part coupled to a second chassis part by a coupling that allows relative pivoting movement between the first and second chassis parts to allow an intermediate section of the chassis to be raised or lowered, wherein said coupling includes a locking device that is operable between a locking mode in which the locking device prevents said relative pivoting movement between the first and second chassis parts, and an unlocked mode in which the locking device allows said relative pivoting movement, and wherein said locking device comprises at least one bolt with at least one corresponding nut, and wherein said at least one bolt is disposed perpendicular to the longitudinal and transverse directions of the chassis, and wherein the position of said at least one nut on the respective bolt determines the amount of said relative pivoting movement.

2. The chassis of claim 1, wherein said coupling includes a first pivot axis running transversely of the chassis and being located between first and second ends of the chassis, said relative pivoting movement comprising movement about said first pivot axis.

3. The chassis of claim 1, wherein said first and second chassis parts are pivotable between an operating state in which said intermediate section is relatively raised, and a lowered state in which said intermediate section is lowered with respect to said operating state, and wherein, in the locking mode, the locking device locks the first and second chassis parts in the operating state, and in the unlocked mode, the locking device allows the first and second chassis parts to adopt the lowered state.

4. The chassis of claim 1, wherein each of the first and second chassis parts comprises at least one wheel assembly, said intermediate section being located between said at least one wheel assembly of the first chassis part and said at least one wheel assembly of the second chassis part, and wherein, said second chassis part has a wheel axis, and wherein said relative pivoting movement involves pivoting movement of said second chassis part about said wheel axis with respect to the first chassis part.

5. The chassis of claim 2, wherein said first chassis part includes a link structure that is pivotably coupled to the second chassis part for pivoting about said first pivot axis, and wherein, said link structure is pivotably coupled to the first chassis part for pivoting about a second pivot axis that is longitudinally spaced apart and parallel with said first pivot axis.

6. The chassis of claim 5, wherein said locking device is coupled between the link structure and the second chassis part and wherein, in the locking mode, the locking device rigidly fixes the link structure with respect to the second chassis part preventing pivoting of said link structure about the first pivot axis, and in the unlocked mode, the locking device permits pivoting of said link structure about the first pivot axis.

7. The chassis of claim 5, wherein said first and second chassis parts are pivotable between an operating state in which said intermediate section is relatively raised, and a lowered state in which said intermediate section is lowered with respect to said operating state, and wherein the link structure pivots downwardly as the chassis moves from the operating state to the lowered state, and pivots upwards as the chassis moves from the lowered state to the operating state.

8. The chassis of claim 1, wherein said first and second chassis parts are pivotable between an operating state in which said intermediate section is relatively raised, and a lowered state in which said intermediate section is lowered with respect to said operating state, and wherein said at least one bolt is long enough to allow said at least one corresponding nut to be positioned on the respective bolt to allow the pivoting movement of the chassis between the operating and lowered states.

9. A conveyor apparatus comprising a chassis and a conveyor supported on the chassis, wherein said chassis comprises a first chassis part coupled to a second chassis part by a coupling that allows relative pivoting movement between the first and second chassis parts to allow an intermediate section of the chassis to be raised or lowered, and wherein the conveyor is movable into and out of a deployed state, and wherein, when said conveyor is out of said deployed state, said conveyor is movable with respect to said chassis in a longitudinal direction of the chassis.

10. The apparatus of claim 9, wherein, in said deployed state, said conveyor is pivotably coupled to said chassis, said apparatus further including an extendible conveyor support coupled between said conveyor and said chassis and operable to raise or lower a first end of said conveyor by pivoting said conveyor with respect to said chassis.

11. The apparatus of claim 9, wherein, when said conveyor is out of said deployed state the conveyor is disposed substantially parallel with a longitudinal axis of the chassis, and wherein said conveyor is pivotably coupled to said chassis by a pivotable support structure, and wherein, when said conveyor is out of said deployed state, said pivotable support structure is decoupled to allow movement of said conveyor with respect to said chassis in said longitudinal direction.

12. The apparatus of 9, wherein, when said conveyor is out of said deployed state, said conveyor is supported by at least one roller and/or at least one slide provided on said chassis for facilitating said movement of said conveyor with respect to said chassis in said longitudinal direction.

13. The apparatus of claim 10, wherein when said conveyor is not in said deployed state, said conveyor support is retractable to move said conveyor with respect to said chassis in said longitudinal direction.

14. The apparatus of claim 10 wherein, when said conveyor is in said deployed state, an end of said conveyor support is pivotably coupled to said chassis, and when said conveyor is out of said deployed state, said end of said conveyor support is decoupled from said chassis to allow said conveyor support to move with said conveyor in said longitudinal direction.

15. The apparatus of claim 9 wherein said conveyor includes at least one extendible conveyor portion, and wherein when said conveyor is out of said deployed state said at least one extendible conveyor portion is folded or otherwise retracted to shorten the length of said conveyor, and wherein, said at least one extendible conveyor portion comprises an extendible base conveyor portion located at a second end of said conveyor and substantially at a first end of said chassis, and wherein when said conveyor is out of said deployed state, said conveyor is movable with respect to said chassis in a longitudinal direction towards said first end of the chassis.

16. The apparatus of claim 9, wherein the chassis is pivotably coupled to a base by a pivot joint that allows pivoting movement of said chassis and said conveyor about a pivot axis that is perpendicular to a ground surface, wherein said pivot joint comprises an upper joint part coupled to said chassis, and a lower joint part coupled to said base, said upper and lower joint parts being coupled together by a spindle that defines said pivot axis and about which the upper joint part is rotatable with respect to the lower part, and wherein said pivot joint includes a rotation sensor for detecting an angular position of said upper joint part with respect to a reference position.

17. The apparatus of any claim 16, wherein said rotation sensor is configured to generate an output signal indicative of the angular position of said upper joint part, said apparatus including, or being co-operable with, a controller configured to use said output signal to determine an angular position of said conveyor and said chassis.

18. The apparatus of claim 16, wherein the rotation sensor is provided on either one of the upper joint part or the spindle, and wherein a sensor target is provided on the other of the upper joint part or the spindle, the rotation sensor being directed at the target.

19. The apparatus of claim 18, wherein the respective one of the target or the rotation sensor is provided on an end of the spindle that protrudes into the upper joint part, and wherein, the respective other of the rotation sensor or the target is provided on the upper joint part at a location facing the end of the spindle.

20. The apparatus of claim 14, wherein at least one track is provided on said chassis, said end of said conveyor support being movable along said at least one track when said end of said conveyor support is decoupled from said chassis.

* * * * *